(12) United States Patent
Zhang

(10) Patent No.: US 10,909,234 B2
(45) Date of Patent: Feb. 2, 2021

(54) METHOD AND APPARATUS FOR UNLOCKING USER INTERFACE

(71) Applicant: Advanced New Technologies Co., Ltd, Grand Cayman (KY)

(72) Inventor: Lei Zhang, Hangzhou (CN)

(73) Assignee: Advanced New Technologies Co. Ltd., Grand Cayman (KY)

(*) Notice: Subject to any disclaimer, the term of this patent is extended or adjusted under 35 U.S.C. 154(b) by 196 days.

(21) Appl. No.: 15/448,518

(22) Filed: Mar. 2, 2017

(65) Prior Publication Data

US 2017/0177858 A1 Jun. 22, 2017

Related U.S. Application Data

(63) Continuation of application No. PCT/CN2015/088217, filed on Aug. 27, 2015.

(30) Foreign Application Priority Data

Sep. 3, 2014 (CN) .......................... 2014 1 0446694

(51) Int. Cl.
*H04L 29/06* (2006.01)
*G06F 21/46* (2013.01)
*G06F 21/31* (2013.01)
*G06F 21/36* (2013.01)

(52) U.S. Cl.
CPC .............. *G06F 21/46* (2013.01); *G06F 21/31* (2013.01); *H04L 63/083* (2013.01); *H04L 63/0846* (2013.01); *G06F 21/36* (2013.01)

(58) Field of Classification Search
CPC ................................ G06F 21/46; G06F 21/36
See application file for complete search history.

(56) References Cited

U.S. PATENT DOCUMENTS 6,192,236 B1* 2/2001 Irvin ................. H04M 1/72533
340/5.1
8,504,842 B1* 8/2013 Meacham ............. G06F 3/0488
713/182
8,943,609 B2* 1/2015 Yun ..................... G06F 3/04883
726/28

(Continued)

FOREIGN PATENT DOCUMENTS

CN 101127137 A 2/2008
CN 101539970 A 9/2009

(Continued)

OTHER PUBLICATIONS

Gao et al., "A New Graphical Password Scheme Resistant to Shoulder-Surfing", 2010 International Conference on Cyberworlds, Date of Conference: Oct. 20-22, 2010.*

(Continued)

*Primary Examiner* — Morshed Mehedi
(74) *Attorney, Agent, or Firm* — Lee & Hayes, P.C.

(57) ABSTRACT

A method and an apparatus for unlocking a user interface are disclosed. The method includes: selecting, when an unlocking interface is triggered, an unlocking password applicable to the interface from preset sets of passwords; and releasing a locked state of the interface when a user input password matching the unlocking password is received. Using the technical solutions of the present disclosure, the security of unlocking may be improved.

17 Claims, 9 Drawing Sheets

(56) References Cited

U.S. PATENT DOCUMENTS

| | | | | |
|---|---|---|---|---|
| 2007/0015490 | A1* | 1/2007 | Munje | H04M 1/66 455/410 |
| 2010/0100948 | A1* | 4/2010 | Delia | G06F 21/31 726/6 |
| 2012/0023592 | A1* | 1/2012 | Wilson | G06F 21/335 726/28 |
| 2012/0246714 | A1* | 9/2012 | Ma | G06F 21/46 726/16 |
| 2013/0024932 | A1* | 1/2013 | Toebes | G06F 21/31 726/19 |
| 2013/0239192 | A1* | 9/2013 | Linga | G06F 21/44 726/7 |
| 2013/0318596 | A1* | 11/2013 | Huang | G06F 21/46 726/18 |
| 2014/0059672 | A1* | 2/2014 | Natividad | G06F 21/31 726/18 |
| 2014/0317724 | A1* | 10/2014 | Hicks | G06F 21/36 726/19 |
| 2014/0373115 | A1* | 12/2014 | Hartman | G06F 21/31 726/6 |
| 2015/0049922 | A1* | 2/2015 | Miller | G06K 9/00255 382/118 |
| 2015/0121515 | A1* | 4/2015 | Aratsu | H04W 12/06 726/19 |
| 2015/0128257 | A1* | 5/2015 | Zhao | H04M 1/67 726/19 |
| 2015/0135291 | A1* | 5/2015 | Yang | H04L 9/3226 726/6 |
| 2015/0281216 | A1* | 10/2015 | Donohue | H04L 63/083 713/171 |
| 2015/0310200 | A1* | 10/2015 | Dan | G06F 21/36 726/19 |
| 2016/0344730 | A1* | 11/2016 | Holz | H04L 63/0876 |
| 2017/0078265 | A1* | 3/2017 | Sundaresh | G06F 21/45 |

FOREIGN PATENT DOCUMENTS

| | | |
|---|---|---|
| CN | 102368200 A | 3/2012 |
| CN | 102779012 | 11/2012 |
| CN | 102779015 | 11/2012 |
| CN | 103019553 A | 4/2013 |
| CN | 103049181 | 4/2013 |
| CN | 103167169 A | 6/2013 |
| CN | 103428351 A | 12/2013 |
| CN | 103745144 A | 4/2014 |
| CN | 103761038 | 4/2014 |
| CN | 203597763 U | 5/2014 |
| CN | 103870152 | 6/2014 |
| JP | 2002312318 A | 10/2002 |
| JP | 2004318839 A | 11/2004 |
| JP | 2007124470 A | 5/2007 |
| JP | 2009159349 A | 7/2009 |

OTHER PUBLICATIONS

European Office Action dated Feb. 26, 2018 for European patent application No. 15837692.1, 8 pages.
Translation of Chinese office action from corresponding CN Patent Application No. 201410446694.1, dated Oct. 31, 2017, 6 pages.
Translation of Chinese search report from corresponding CN Patent Application No. 201410446694.1, dated Oct. 23, 2017, 1 page.
European Office Action dated Sep. 21, 2018 for European patent application No. 15837692.1, a counterpart foreign application of U.S. Appl. No. 15/448,518, 8 pages.
Machine translation of the second Chinese Office Action dated Sep. 25, 2018 for Chinese patent application No. 201410446694.1, a foreign counterpart application of U.S. Appl. No. 15/448,518, 7 pages.
European Office Action dated Feb. 1, 2019 for European Patent Application No. 15837692.1, a counter part of U.S. Appl. No. 15/448,518, 7 pages.
Japanese Office Action dated Mar. 12, 2019 for Japanese Patent Application No. 2017-512305, a counterpart of U.S. Appl. No. 15/448,518, 8 pages.
Japanese Office Action dated on Sep. 10, 2019 for Japanese Patent Application No. 2017-512305, a counterpart of U.S. Appl. No. 15/448,518, 4 pages.
Machine translation of the fourth Chinese Office Action dated Oct. 25, 2019 for Chinese patent application No. 201410446694.1, a foreign counterpart application of U.S. Appl. No. 15/448,518, 13 pages.
Machine translation of the third Chinese Office Action dated Jul. 12, 2019 for Chinese patent application No. 201410446694.1, a foreign counterpart application of U.S. Appl. No. 15/448,518, 11 pages.
Translation of Chinese search report from corresponding CN Patent Application No. 201410446694.1, dated Mar. 13, 2020, 1 page.
Translation of Chinese search report from corresponding CN Patent Application No. 201410446694.1, dated Jul. 4, 2019, 1 page.
Translation of Chinese search report from corresponding CN Patent Application No. 201410446694.1, dated Sep. 14, 2018, 1 page.
International Search Report from the corresponding PCT application No. PCT/CN2015/088217, dated Nov. 2, 2015, 2 pages.
Written Opinion from the corresponding PCT application No. PCT/CN2015/088217, dated Nov. 2, 2015, 5 pages.

* cited by examiner

METHOD AND APPARATUS FOR UNLOCKING USER INTERFACE

CROSS REFERENCE TO RELATED PATENT APPLICATIONS

This application claims priority to and is a continuation of PCT Patent Application No. PCT/CN2015/088217, filed on 27 Aug. 2015, and is related to Chinese Patent Application No. 2014/10446694.1 filed on 3 Sep. 2014, entitled "Method and Apparatus for Unlocking User Interface," which are hereby incorporated by reference in their entirety.

TECHNICAL FIELD

The present disclosure relates to the field of terminal technologies, and in particular, to methods and apparatuses for unlocking a user interface.

BACKGROUND

Due to considerations of personal privacy and data security, an increasing number of applications have a locking function added thereto, such that a corresponding user interface can be unlocked only when a correct unlocking password is inputted. However, in many situations, a user has to complete an unlocking operation while being watched by other persons, leading to the unlocking password being easily obtained by the other persons, and thus creating a severe potential security problem.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

Accordingly, the present disclosure provides a new technical solution, which can solve a technical issue that an unlocking password is peeped at to cause a potential security problem in existing technologies.

To achieve the above objective, the present disclosure provides technical solutions as follows.

According to a first aspect of the present disclosure, a user interface unlocking method is provided. In implementations, the method may include selecting, when an unlocking interface is triggered, an unlocking password applicable to the interface from a plurality of preset sets of password; and releasing a locked state of the interface in response to receiving a user input password that matches the unlocking password.

According to a second aspect of the present disclosure, a user interface unlocking apparatus is provided. In implementations, the apparatus may include a selection unit configured to select, when an unlocking interface is triggered, an unlocking password applicable to the current unlocking interface from a plurality of preset sets of passwords; and an unlocking unit configured to release a locked state of the interface in response to receiving a user input password that matches the unlocking password.

As can be seen from the above technical solutions, the present disclosure configures a plurality of sets of unlocking passwords that are valid in a rotating manner. Even though a set of password is peeped at, an actually valid unlocking password may be selected. As such, the password that is peeped at cannot be used for releasing a locked state of a user interface, thereby facilitating a security improvement.

DETAILED DESCRIPTION

The following embodiments are provided for description of the present disclosure in further detail.

Figure 1:
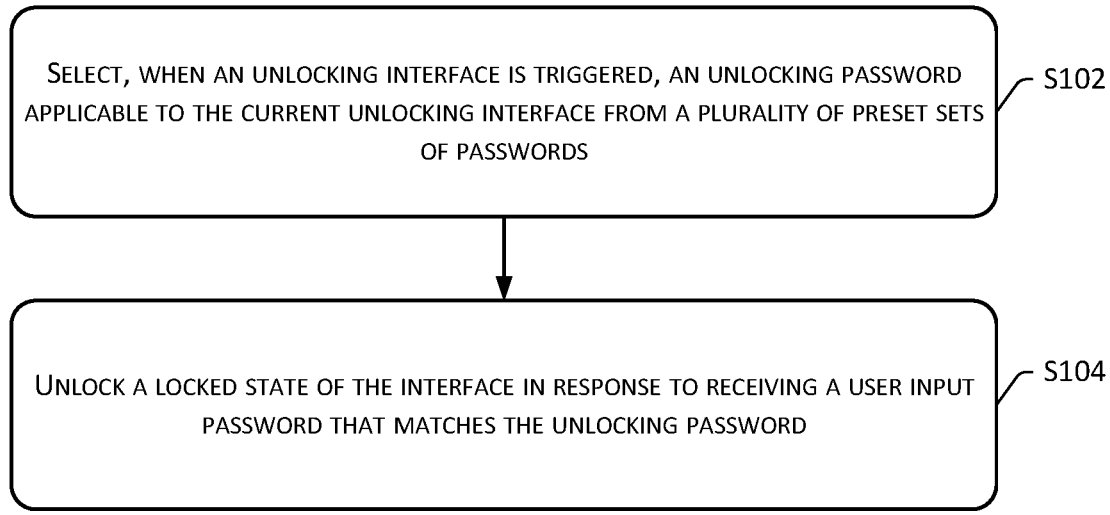
FIG. 1 is a flowchart of a user interface unlocking method according to an exemplary embodiment of the present disclosure.

Referring to FIG. 1, FIG. 1 shows a user interface unlocking method 100 according to an exemplary embodiment of the present disclosure, which may be applicable in a terminal. In implementations, the method 100 may include the following operations.

S102 selects, when an unlocking interface is triggered, an unlocking password applicable to the current unlocking interface from a plurality of preset sets of passwords.

In implementations, a user may set up multiple sets of passwords corresponding to each unlocking interface in advance. The number of passwords may be set according to needs, for example, 3 sets or 5 sets. A specific number thereof is not limited in the present disclosure. Each unlocking interface has a corresponding application, and the unlocking interface is used for restricting privileges of a user to access data or information in the application, for example, a desktop loading program (corresponding to a lock screen interface of a mobile phone) or any APP (Application) such as "Alipay™" installed in a terminal.

In implementations, different unlocking interfaces may separately be provided with corresponding sets of passwords. Alternatively, the same sets of passwords may be shared by multiple unlocking interfaces.

In implementations, each time a user triggers an unlocking interface, a current valid password (i.e., an unlocking password) is re-selected, thus facilitating an improvement in security as compared with a manner of adopting a single password only in existing technologies.

S104 unlocks a locked state of the interface in response to receiving a user input password that matches the unlocking password.

As can be seen from above, the present disclosure sets multiple sets of passwords for an unlocking interface and selects a valid password from the multiple sets of passwords when the unlocking interface is triggered, such that the same unlocking interface may be corresponding to different unlocking passwords in multiple unlocking processes. As such, even though an unlocking password inputted by a user has been peeped at by another person, the same password is most likely unable to unlock the corresponding unlocking interface, thereby significantly improving the security.

Figure 2:
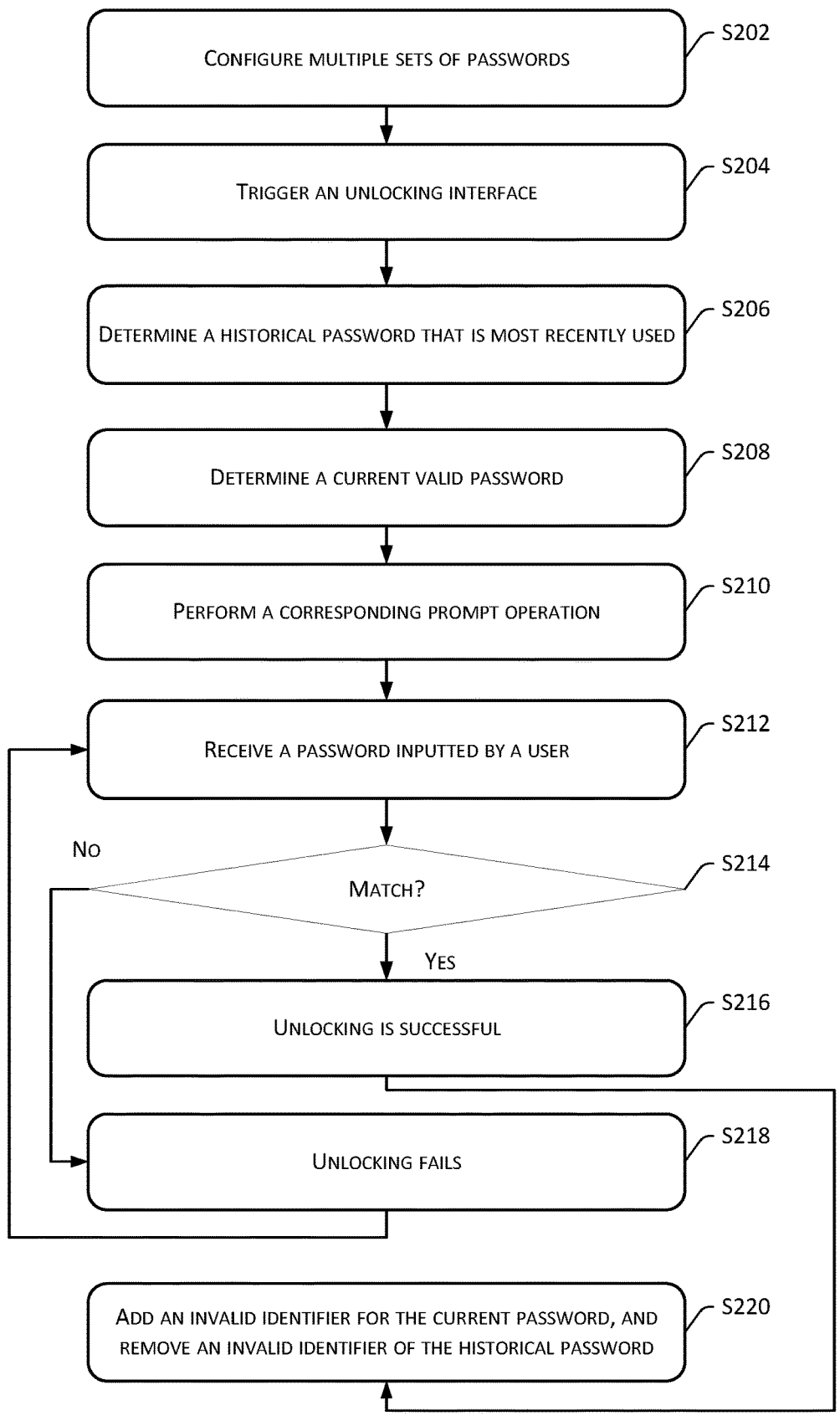
FIG. 2 is a flowchart of a user interface unlocking method according to another exemplary embodiment of the present disclosure.

The technical solution of the present disclosure is described in detail with reference to specific application scenarios hereinafter. Referring to FIG. 2, FIG. 2 shows a user interface unlocking method 200 according to an exemplary embodiment of the present disclosure. In implementations, the method 200 may include the following operations.

S202 configures multiple sets of passwords according to a user operation.

In implementations, multiple sets of passwords are assumed to be set up by a user for a terminal lock screen interface. The multiple sets of passwords that are set may only be used for the terminal lock screen interface, and may also be applicable to another lock screen interface. The user may perform configuration according to needs.

Figure 3:
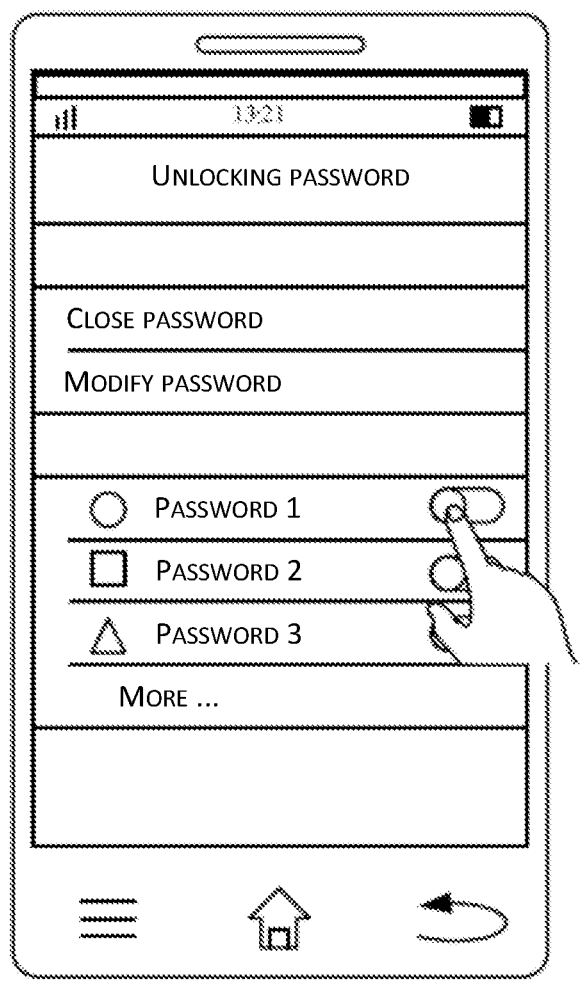
FIG. 3-FIG. 7 are schematic diagrams of an interface according to exemplary embodiments of the present disclosure.

When setting up passwords for a lock screen interface of a terminal, a user may first switch to a "Password Lock" interface as shown in FIG. 3, to configure password-related options. As shown in FIG. 3, the terminal may have three sets of passwords set up by default, namely, a password 1, a password 2, and a password 3. Apparently, the user may select only two sets of passwords thereof according to an actual requirement, or set up more sets of passwords by selecting "More". In a configuration interface as shown in FIG. 3, a corresponding pattern is provided before each set of password. For example, the password 1 corresponds to "○", the password 2 corresponds to "□", and the password 3 corresponds to "△", such that the sets of passwords can be effectively distinguished from each other. If the user needs to configure the password 1, the user may switch to a "Set password 1" interface as shown in FIG. 4 by sliding a "Slider" icon behind the password 1.

Figure 4:
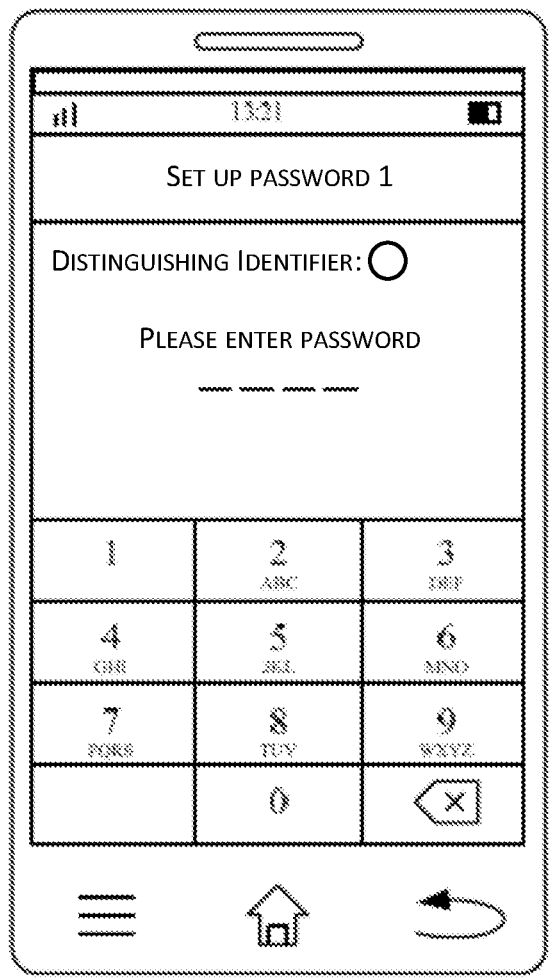

As shown in FIG. 4, the user may perform an input operation via a keyboard at the bottom of the interface, thereby implementing the configuration of the password 1. At the same time, "Distinguishing identifier: ○" is displayed on the interface to prompt the user to conduct an associative memory between such pattern and the password 1. Therefore, accurate input can be achieved during usage.

S204 triggers an unlocking interface.

In implementations, a lock screen interface of a terminal is used as an example. A triggering may occur in response to detecting that "power button", "volume button", "home button" or another type of physical button on the terminal is pressed. Moreover, a triggering may occur in response to detecting that a light change, a spatial position change or another parameter meets a preset parameter. An example includes switching a screen of the terminal from a non-display state (i.e., "black screen") to a display state. An APP in a terminal is used as an example. In response to detecting that a corresponding program icon is pressed, a corresponding unlocking interface may be triggered.

S206 determines a historical password that is most recently used.

In implementations, if a current triggering and unlocking activity is the $(N+1)^{th}$ one that is performed on a lock screen interface of a terminal, a "historical password that is most recently used" is a password used when an unlocking operation is performed on the lock screen interface of the terminal at the $N^{th}$ time.

TABLE 1

| Set | Password | Invalid identifier |
|-----|----------|--------------------|
| 1   | 1362     | 1                  |
| 2   | 0724     | 0                  |
| 3   | 2014     | 0                  |

In implementations, an available state of each set of password may be marked to determine a "historical password that is most recently used". For example, a user sets three sets of passwords for a terminal lock screen interface: "Password 1:1362", "Password 2:0724", and "Password 3:2014", as shown in Table 1. A value of an invalid identifier corresponding to the password 1 is 1, and values of invalid identifiers corresponding to the password 2 and the password 3 are 0, indicating that the password 1 is the password that is used at the $N^{th}$ time (i.e., the "historical password that is most recently used").

S208 determines a current valid password.

In implementations, upon determining that the "historical password applied recently" is the password 1, an unlocking password applied to a current unlocking operation, i.e., a "current valid password", may be selected from among the remaining password 2 and password 3. Therefore, the password 1 cannot be used for the current $(N+1)^{th}$ unlocking operation, even though having been recorded by another person during the $N^{th}$ unlocking operation.

For example, when a current valid password is selected, the remaining password 2 and password 3 may be selected sequentially according to a preset order of the multiple sets of passwords. For example, if the order of the multiple sets of passwords is an order of arrangement of entries in Table 1: password 1→password 2→password 3→password 1 . . . . . . , the password 2 is to be selected accordingly as the current valid password when the password 1 is an invalid password. Similarly, if the password 2 is an invalid password, the password 3 is to be selected in turn as the current valid password. If the password 3 is an invalid password, the password 1 is to be selected in turn as the current valid password. If the order of the multiple sets of passwords is another order: password 1→password 3→password 2→password 1 . . . . . . , the password 3 is to be selected in turn as the current valid password when the password 1 is an invalid password. Similarly, if the password 2 is an invalid password, the password 1 is to be selected in turn as the current valid password, and if the password 3 is an invalid password, the password 2 is to be selected in turn as the current valid password.

For another example, according to storage positions of entries corresponding to the multiple sets of passwords in Table 1, a password adjacent to an invalid password may also be selected as a current valid password. For example, when the password 1 is an invalid password, the password 2 adjacent thereto may be selected as a valid password.

For another example, a set of password may be randomly selected as a current valid password from among all remaining passwords other than an invalid password.

Apparently, as another exemplary embodiment, S206 and S208 may not be used to select a current valid password, and the current valid password may be randomly selected directly from the corresponding multiple sets of passwords each time when the terminal lock screen interface is triggered, to ensure the security through the randomness of password selection.

S210 performs a corresponding prompt operation according to the determined current valid password.

In implementations, by performing a prompt operation, a user who has a true usage permission may know a current valid password and input a correct password. A number of approaches of performing a prompt operation exist, and any approach that is able to establish a unique correspondence between a prompt operation and a password is applicable to the technical solutions of the present disclosure.

Figure 5:
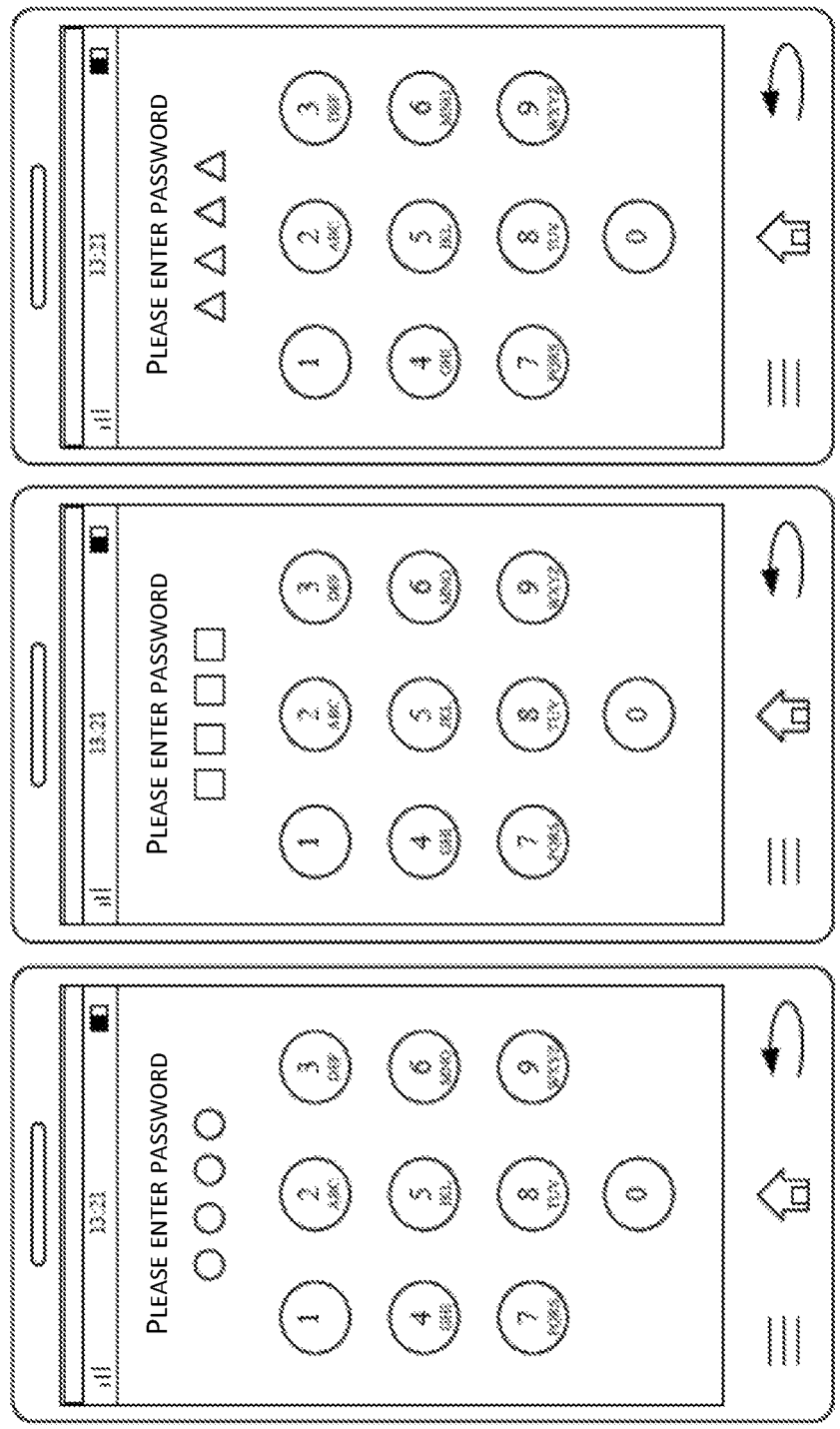

For example, the password 1, the password 2, and the password 3 in FIG. 3 each have corresponding patterns individually. Therefore, a corresponding pattern may be displayed on a terminal lock screen interface to implement a prompt operation. For example, as shown in FIG. 5, if the current valid password is the password 1, a "password display box" may be set as "○" corresponding to the password 1, i.e., "○○○○" as shown in FIG. 5(a) (the number of "○" here corresponds to the number of digits of the password, i.e., the password in the current example has 4 digits). If the current valid password is the password 2, the "password display box" may be set as "□" corresponding to the password 2, i.e., "□□□□" as shown in FIG. 5(b). If the current valid password is the password 3, the "password display box" may be set as "Δ" corresponding to the password 3, i.e., "ΔΔΔΔ" as shown in FIG. 5(c).

For instance, patterns such as "○", "□" and "Δ" in the examples as shown in FIG. 5 may all belong to visual identifying information, i.e., identifying information for recognition and differentiation through a visual difference. Similarly, effective differentiation of different passwords may also be implemented by, for example, pictures, dynamic pictures, background colors, numerical buttons or colors of characters therein, colors of a password display box, etc.

Figure 6:
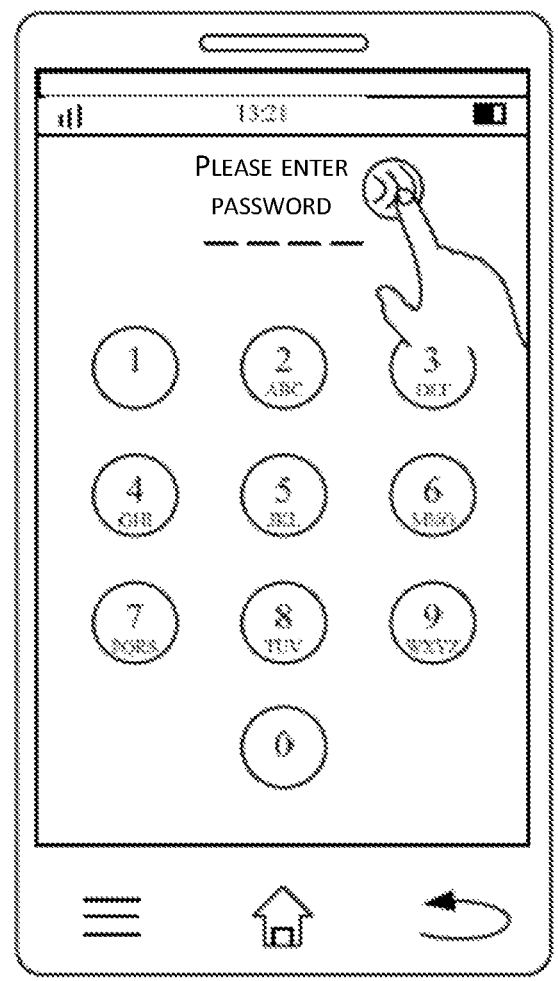

Moreover, other forms of prompt operations may also be used to achieve distinguishing between different passwords. For example, as another exemplary implementation, if prompt information is a multimedia file, i.e., an audio file, a video file, etc., the multimedia file may be played to mark a password from an auditory perspective or an auditory and visual perspective. Specifically, a play button as shown in FIG. 6 may be set on the terminal unlocking interface, and a corresponding multimedia file may be played by clicking the button. For another example, as another exemplary implementation, if prompt information is vibration control information, different vibration effects (such as vibration strength and vibration time, etc.) may be implemented by a control terminal to identify passwords. One skilled in the art should understand that a specific form of a prompt operation is not limited herein, and any technical measure that is able to distinguish multiple sets of passwords is applicable to the technical solutions of the present disclosure.

S212 receives a password inputted by a user.

Figure 7:
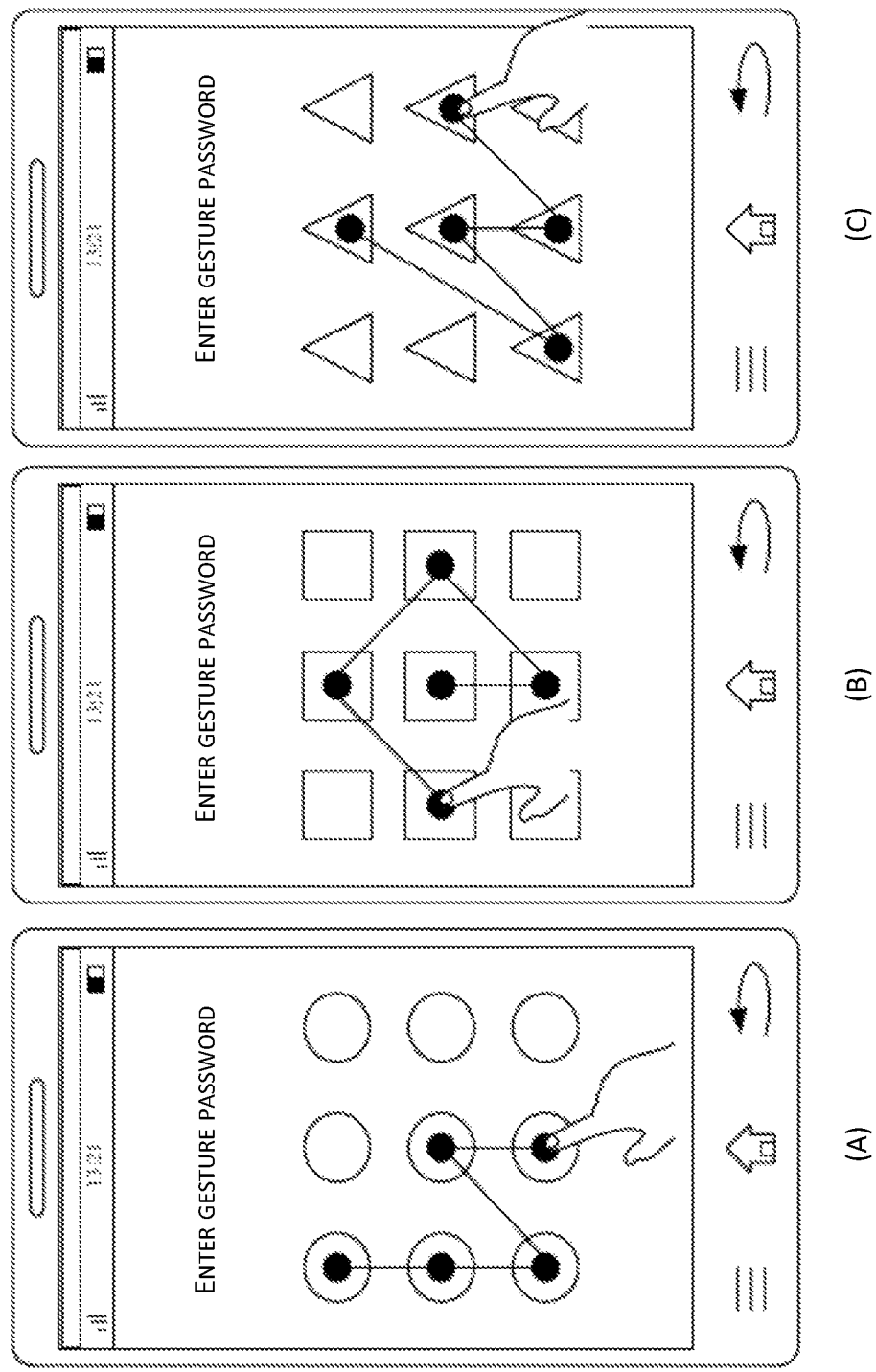

In implementations, when the password is a numerical password as shown in Table 1, e.g., the password 1 "1362", the user may input a corresponding combination of numerals through a number key pad in FIG. 5(a). Apparently, the "numerical password" is merely an exemplary implementation of an unlocking password in the present disclosure. In another exemplary implementation, the unlocking password may use a "gesture pattern" as shown in FIG. 7, for example.

For example, each node in FIG. 7(a) is "○", and the current valid password is the password 1 as shown in Table 1. Each node in FIG. 7(b) is "□", and the current valid password is the password 2 as shown in Table 1. Each node in FIG. 7(c) is "Δ", and the current valid password is the password 3 as shown in Table 1. Apparently, one skilled in the art should understand that a specific form of an unlocking password is not limited herein, and other forms of unlocking passwords are apparently applicable to the technical solutions of the present disclosure.

S214 determines whether the password inputted by the user matches the current valid password, proceeds to S216 if matched, or proceeds to S218 otherwise.

S216 proceeds to S220, and unlocking is successful.

S218 proceeds to S212, and the unlocking fails.

S220 adds an invalid identifier for the current password, and removes an invalid identifier of the historical password (i.e., the "historical password that is most recently used") determined at S206.

In implementations, after the "historical password that is most recently used" is identified by the "invalid identifier" at S206, the terminal lock screen interface is unlocked as the password inputted by the user at S214 matches the current valid password. Therefore, the $(N+1)^{th}$ unlocking operation performed on the terminal lock screen interface is completed, and the "historical password that is most recently used" is updated to the password used when the $(N+1)^{th}$ unlocking operation is performed on the terminal lock screen interface.

For example, if the unlocking password used at the $(N+1)^{th}$ time is the password 2, a value of an invalid identifier corresponding to the password 2 needs to be modified to "1", and a value of an invalid identifier corresponding to the password 1 needs to be modified to "0", as shown in Table 2. Therefore, when triggering and unlocking operations are performed on the terminal lock screen interface for the $(N+2)^{th}$ time, the password 2 will not be selected.

TABLE 2

| Set | Password | Invalid identifier |
| --- | --- | --- |
| 1 | 1362 | 0 |
| 2 | 0724 | 1 |
| 3 | 2014 | 0 |

In addition, it should be noted that operations such as S210 for performing a prompt operation as shown in FIG. 2, may not be needed. For example, the user may know or set a manner of selecting an unlocking password from multiple sets of passwords in advance, such as the multiple sets of passwords being valid sequentially, each set of password being valid in a corresponding period of time, each set of password being valid in a corresponding geographical location, an unlocking control type in a current unlocking interface, etc. Therefore, the user may determine an unlocking password to be used currently based on a current state or condition, thereby implementing an unlocking operation smoothly.

The "unlocking control type in a current unlocking interface" may be understood as: multiple types of unlocking controls may be used for the same unlocking interface, such as a "keyboard input" type (as shown in FIG. 4 to FIG. 6), a "nine-grid pattern" type (as shown in FIG. 7, including 3×3=9 contact points), and a "sixteen-grid pattern" type (including 4×4=16 contact points, which is similar to the "nine-grid pattern" and is not shown in the drawing). A user may set up an individual password corresponding to each unlocking control type, such that a corresponding unlocking password may be determined based on an unlocking control type used in a current unlocking interface. Correspondingly, passwords of the same unlocking control type may be used as the "multiple sets of passwords" in the present disclosure, for example, all of a character type that needs to be inputted (corresponding to an unlocking control of the "keyboard input" type) or a gesture type (corresponding to an unlocking control of the "nine-grid pattern" type or "sixteen-grid pattern" type). Alternatively, passwords of multiple unlocking control types may also be used.

Figure 8:
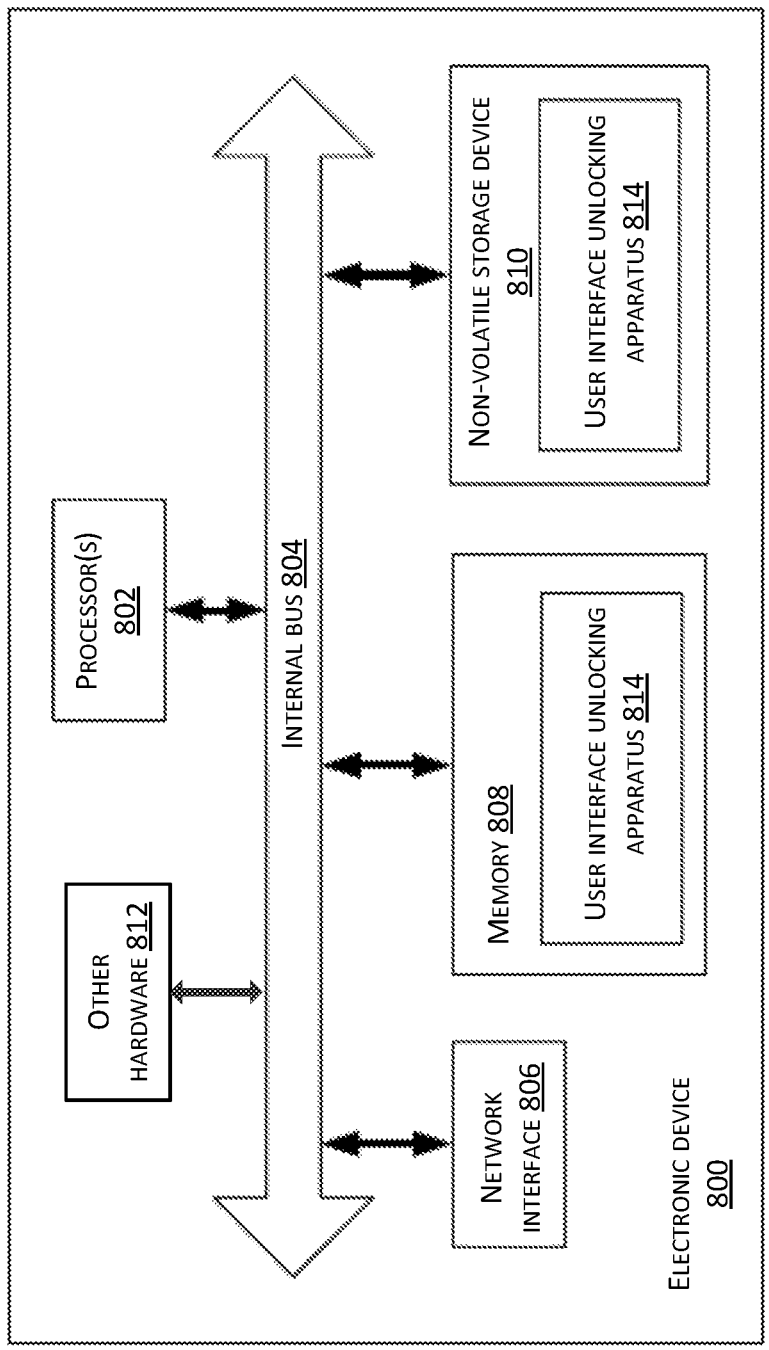
FIG. 8 is a schematic structural diagram of an electronic device according to an exemplary embodiment of the present disclosure.

In a typical configuration, a computing device includes one or more processors (CPU), an input/output interface, a network interface, and memory. FIG. 8 is a schematic structural diagram of an electronic device 800 according to an exemplary embodiment of the present disclosure. Referring to FIG. 8, on a hardware level, the electronic device 800 may include processor(s) 802, an internal bus 804, a network interface 806, memory 808, and a non-volatile storage device 810, and may apparently further include other hardware 812 as required by other services. The processor(s) 802 read(s) a corresponding computer program from the non-volatile storage device 810 into the memory 808 and runs the computer program, thereby forming a user interface unlocking apparatus 814 on a logic level. Apparently, besides software implementation, the present disclosure does not exclude other implementations, such as implementations in a form of logic devices or a combination of software and hardware. In other words, executing entities in the following flow of processing may include, but not limited to, various logic units, and may also include hardware or logic devices.

The memory 808 may include a form of computer-readable media, e.g., a non-permanent storage device, random-access memory (RAM) and/or a nonvolatile internal storage, such as read-only memory (ROM) or flash RAM. The memory 808 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

Figure 9:
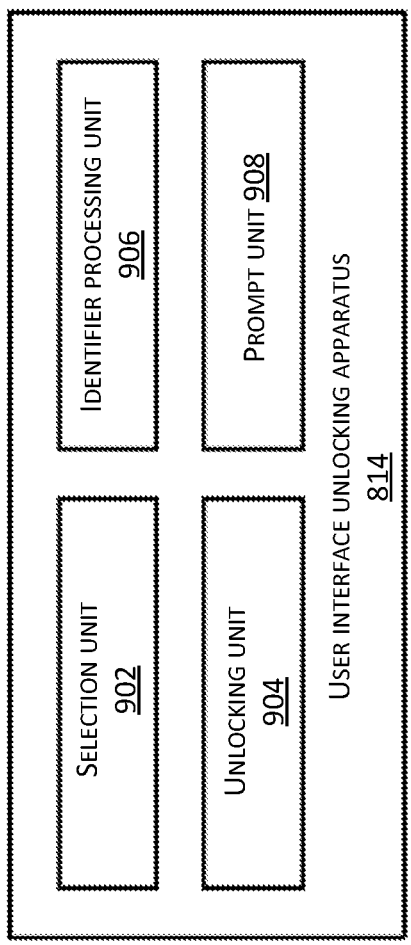
FIG. 9 is a block diagram of a user interface unlocking apparatus according to an exemplary embodiment of the present disclosure.

Referring to FIG. 9, in implementations, the user interface unlocking apparatus 814 may include a selection unit 902 and an unlocking unit 904.

The selection unit 902 may select, when an unlocking interface is triggered, an unlocking password applicable to the interface from among multiple preset sets of passwords.

The unlocking unit 904 may release a locked state of the interface in response to receiving a user input password that matches the unlocking password.

In implementations, the selection unit 902 may further determine a historical password that is most recently applied to the current unlocking interface, and select the unlocking password from remaining passwords in the multiple sets of passwords.

In implementations, the selection unit 902 may further select a set of password provided with an invalid identifier as the historical password from the multiple sets of passwords.

In implementations, the user interface unlocking apparatus 814 may further include an identifier processing unit 906 configured to add the invalid identifier for the unlocking password when the user input password matching the unlocking password is received, and remove the invalid identifier corresponding to the historical password.

In implementations, the selection unit 902 may further use a set of password that is adjacent to the historical password as the unlocking password based on the historical password and a preset order of the multiple sets of passwords.

In implementations, the user interface unlocking apparatus 814 may further include a prompt unit 908 configured to determine prompt information corresponding to the unlocking password, and perform a prompt operation according to the prompt information.

In implementations, the prompt information includes at least one of the following: visual identifying information, a multimedia file, and vibration control information.

By setting up multiple sets of unlocking passwords that are valid successively, the present disclosure can therefore select an actually valid unlocking password even though a certain set of password has been peeped at. As such, the password that has been peeped at cannot be used for unlocking a locked state of a user interface, thereby facilitating an improvement in the security.

It should be further noted that terms such as "comprise", "include" and any other variants thereof are intended to cover a non-exclusive inclusion. A process, method, product or device that includes a series of elements not only includes those elements, but also includes other elements that are not explicitly listed, or further includes elements that already existed in such process, method, product or device. In a condition without further limitations, an element defined by a phrase "include a/an . . . " does not exclude any other similar elements from existing in the process, method, product or device.

The above descriptions are merely preferred embodiments of the present disclosure, and are not intended to limit the present disclosure. Any modifications, equivalent replacements and improvements made without departing from the spirit and principles of the present disclosure shall fall within the scope of protection of the present disclosure.

The invention claimed is:

1. A method implemented by a computing device, the method comprising:
   selecting an unlocking password applicable to an unlocking interface from a plurality of passwords in response to the unlocking interface being triggered;
   performing a corresponding prompt operation based on prompt information that corresponds to the unlocking password, different prompt operations being used for distinguishing different passwords of the plurality of passwords and comprising displaying different patterns of shapes or different colors of characters for the different passwords of the plurality of passwords; and
   unlocking a locked state of the unlocking interface in response to receiving a user input password that matches the unlocking password, wherein the plurality of passwords are sequentially selected to be a valid password according to a preset order.

2. The method of claim 1, wherein selecting the unlocking password comprises:

determining a historical password that is most recently applied to the unlocking interface; and selecting the unlocking password from remaining passwords of the plurality of passwords.

3. The method of claim 2, wherein determining the historical password comprises selecting a particular password having an invalid identifier as the historical password from the plurality of passwords.

4. The method of claim 3, further comprising removing the invalid identifier for the historical password and adding the invalid identifier for the unlocking password in response to receiving the user input password that matches the unlocking password.

5. The method of claim 1, further comprising:

determining the prompt information corresponding to the unlocking password.

6. An apparatus implemented by a device comprising one or more processors and memory, the apparatus comprising:

a selection unit stored in the memory and executable by the one or more processors to select an unlocking password applicable to an unlocking interface from a plurality of passwords when the unlocking interface is triggered;

a prompt unit stored in the memory and executable by the one or more processors to perform a corresponding prompt operation based on prompt information that corresponds to the unlocking password, different prompt operations being used for distinguishing different passwords of the plurality of passwords and comprising displaying different patterns of shapes or different colors of characters for the different passwords of the plurality of passwords; and an unlocking unit stored in the memory and executable by the one or more processors to release a locked state of the unlocking interface when a user input password matching the unlocking password is received, wherein the plurality of passwords are selected to be a valid password in a round-robin manner.

7. The apparatus of claim 6, wherein the selection unit further determines a historical password that is most recently applied to the unlocking interface, and selects the unlocking password from remaining passwords in the plurality of passwords.

8. The apparatus of claim 7, wherein the selection unit further selects a particular password having an invalid identifier as the historical password from the plurality of passwords.

9. The apparatus of claim 8, further comprising an identifier processing unit to remove the invalid identifier for the historical password and add the invalid identifier for the unlocking password when the user input password matching the unlocking password is received.

10. The apparatus of claim 6, wherein the prompt unit to determine the prompt information corresponding to the unlocking password.

11. One or more computer-readable media storing executable instructions that, when executed by one or more processors, cause the one or more processors to perform acts comprising:

selecting an unlocking password applicable to an unlocking interface from a plurality of passwords in response to the unlocking interface being triggered;

performing a corresponding prompt operation based on prompt information that corresponds to the unlocking password, different prompt operations being used for distinguishing different passwords of the plurality of passwords and comprising displaying different patterns of shapes or different colors of characters for the different passwords of the plurality of passwords; and unlocking a locked state of the unlocking interface in response to receiving a user input password that matches the unlocking password, wherein the plurality of passwords are sequentially selected to be a valid password according to a preset order.

12. The one or more computer-readable media of claim 11, wherein selecting the unlocking password comprises:

determining a historical password that is most recently applied to the unlocking interface; and selecting the unlocking password from remaining passwords of the plurality of passwords.

13. The one or more computer-readable media of claim 12, wherein determining the historical password comprises selecting a particular password having an invalid identifier as the historical password from the plurality of passwords.

14. The one or more computer-readable media of claim 13, the acts further comprising removing the invalid identifier for the historical password and adding the invalid identifier for the unlocking password in response to receiving the user input password that matches the unlocking password.

15. The method of claim 1, wherein the different prompt operations further comprise: displaying a pattern corresponding to a password according to the visual displaying information, playing the multimedia file to mark a password corresponding to the multimedia file, and implementing a vibration effect to identify a password corresponding to the vibration control information.

16. The apparatus of claim 6, wherein the different prompt operations further comprise: displaying a pattern corresponding to a password according to the visual displaying information, playing the multimedia file to mark a password corresponding to the multimedia file, and implementing a vibration effect to identify a password corresponding to the vibration control information.

17. The one or more computer-readable media of claim 11, wherein the different prompt operations further comprise: displaying a pattern corresponding to a password according to the visual displaying information, playing the multimedia file to mark a password corresponding to the multimedia file, and implementing a vibration effect to identify a password corresponding to the vibration control information.

* * * * *